(12) United States Patent
Wang et al.

(10) Patent No.: US 11,916,192 B2
(45) Date of Patent: Feb. 27, 2024

(54) MULTILAYER SOLID-STATE ELECTROLYTE, BATTERY CELLS INCLUDING THE SAME, AND METHODS OF MAKING THE SAME

(71) Applicants: Zhongchun Wang, San Jose, CA (US); Arvind Kamath, Los Altos, CA (US)

(72) Inventors: Zhongchun Wang, San Jose, CA (US); Arvind Kamath, Los Altos, CA (US)

(73) Assignee: Ensurge Micropower ASA, Oslo (NO)

( * ) Notice: Subject to any disclaimer, the term of this patent is extended or adjusted under 35 U.S.C. 154(b) by 599 days.

(21) Appl. No.: 17/185,159

(22) Filed: Feb. 25, 2021

(65) Prior Publication Data
US 2021/0320324 A1     Oct. 14, 2021

Related U.S. Application Data

(60) Provisional application No. 63/009,357, filed on Apr. 13, 2020.

(51) Int. Cl.
| | |
|---|---|
| *H01M 10/0562* | (2010.01) |
| *H01M 10/0525* | (2010.01) |
| *H01M 10/0585* | (2010.01) |
| *H01M 4/62* | (2006.01) |
| *H01M 4/36* | (2006.01) |
| *H01M 4/02* | (2006.01) |

(52) U.S. Cl.
CPC ....... *H01M 10/0562* (2013.01); *H01M 4/366* (2013.01); *H01M 4/62* (2013.01); *H01M 10/0525* (2013.01); *H01M 10/0585* (2013.01); *H01M 2004/027* (2013.01); *H01M 2300/0071* (2013.01); *H01M 2300/0094* (2013.01)

(58) Field of Classification Search
None
See application file for complete search history.

(56) References Cited

U.S. PATENT DOCUMENTS

| | | | |
|---|---|---|---|
| 2006/0062904 A1* | 3/2006 | West | H01M 4/131 427/126.3 |
| 2018/0198170 A1* | 7/2018 | Fujita | H01M 4/661 |

\* cited by examiner

*Primary Examiner* — Wyatt P McConnell
(74) *Attorney, Agent, or Firm* — Andrew D. Fortney; Central California IP Group, P.C.

(57) ABSTRACT

A multilayer solid-state electrolyte, solid-state battery cells including the same, and methods of making the electrolyte and the battery cells are disclosed. The multi-layer solid-state electrolyte includes a solid bulk electrolyte layer comprising carbon-doped lithium phosphorus oxynitride (LiPON) or $WO_{3+x}$ (where $0 \leq x \leq 1$), and a solid anode interface layer comprising LiPON or a metal oxide that forms a stable complex oxide with lithium oxide and conducts lithium ions when lithiated. The anode interface layer has a thickness less than that of the bulk electrolyte layer. The method of making the multi-layer solid-state electrolyte includes depositing one of the solid bulk electrolyte layer and the solid anode interface layer on an active layer of a battery cell, then depositing the other layer on the one layer. As for the solid-state electrolyte, the anode interface layer has a thickness less than that of the bulk electrolyte layer.

20 Claims, 5 Drawing Sheets

MULTILAYER SOLID-STATE ELECTROLYTE, BATTERY CELLS INCLUDING THE SAME, AND METHODS OF MAKING THE SAME

CROSS REFERENCE TO RELATED APPLICATION(S)

This application claims the benefit of U.S. Provisional Patent Application No. 63/009,357, filed on Apr. 13, 2020, incorporated herein by reference as if fully set forth herein.

FIELD OF THE INVENTION

The present invention generally relates to the field of solid-state and/or thin film batteries. More specifically, embodiments of the present invention pertain to a multilayer solid-state electrolyte, battery cells including the same, and methods of making the electrolyte and the battery cells.

DISCUSSION OF THE BACKGROUND

Solid state lithium batteries (SSLB) include thin film devices that contain, but are not restricted to, materials such as lithium (Li), lithium cobalt oxide (LCO) and lithium phosphorus oxynitride (LiPON). FIG. 1 shows a conventional SSLB stack 100, which includes a cathode current collector 110, a cathode 120 (e.g., LCO) on the cathode current collector 110, a single-layer solid electrolyte layer 130 (i.e., LiPON) on the cathode 120, a lithium anode 140 on the electrolyte 130, and an anode current collector 150 on the lithium anode 140. (The anode 140 may not be present when the SSLB is discharged, and is formed between the electrolyte 130 and the anode current collector 150 during a charging operation. Optionally, a thin lithium anode 140 can be deposited onto the electrolyte layer 130 in a conventional SSLB during fabrication.)

Lithium phosphorus oxynitride (LiPON) has been widely adopted as a solid electrolyte layer for solid-state thin film lithium batteries. However, shortcomings of LiPON electrolytes include its low deposition rate. Typically, LiPON is deposited by RF sputtering using a $Li_3PO_4$ target. It generally takes about 4 hours to deposit a 1 μm thick LiPON coating. However, LiPON layers deposited by RF sputtering are generally not conformal. Thus, devices incorporating a LiPON layer often have a high level of defects such as pinholes. As a result, a thickness of 2 μm is usually needed for LiPON layers in a device such as a solid-state and/or thin film battery (TFB), to avoid electrical leakage due to the presence of the pinholes and other defects. Therefore, it takes at least about 8 hours to form a commercially satisfactory LiPON layer in a TFB. This severely limits the throughput in a production line for solid-state Li TFBs. Furthermore, the Li-ion conductivity of conventional LiPON electrolytes is typically $1\times10^{-6}$ S/cm, which is not high enough for some applications in which high charge and discharge rates are beneficial.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention relates to solid-state and thin film batteries, and more specifically to a multilayer solid-state electrolyte, solid-state battery cells including the same, and methods of making the electrolyte and the battery cells. Embodiments of the present invention pertain to a multilayer electrolyte for solid-state battery cells and methods of making the same. Batteries that include the present multilayer solid-state electrolyte generally show the same performance as or better performance than a conventional thin film battery containing an otherwise identical conventional LiPON layer. Also, the present multilayer solid-state electrolyte can be deposited in a much shorter time (25% or less of the time typically required for depositing the otherwise identical conventional LiPON layer).

In one aspect, the present invention relates to a multi-layer solid-state electrolyte, comprising a solid bulk electrolyte layer comprising carbon-doped lithium phosphorus oxynitride (LiPON) or $WO_{3+x}$, and a solid anode interface layer comprising LiPON (e.g., undoped lithium phosphorus oxynitride) or a metal oxide that forms a stable complex oxide with lithium oxide and conducts lithium ions when lithiated. The anode interface layer has a thickness less than that of the bulk electrolyte layer. For example, the anode interface layer may have a thickness of 10-100 nm, and the bulk electrolyte layer may have a thickness of 0.5-5 μm. In the formula $WO_3+x$, $0\le x\le 1$.

In various embodiments, the anode interface layer is chemically stable against elemental lithium and/or is resistive to electrons and/or electron flow. For example, the anode interface layer may have a resistivity of $\ge 10^{10}$ Ohm cm (e.g., $10^{14}$-$10^{20}$ Ohm cm). Various examples of the anode interface layer may comprise $Al_2O_3$, $HfO_2$, $ZrO_2$, or ZnO, any of which may further comprise lithium. For example, the anode interface layer may comprise a combination of lithium oxide with $Al_2O_3$, $HfO_2$, $ZrO_2$, or ZnO.

In various embodiments, the anode interface layer has a thickness of ≤50 nm, and the bulk electrolyte layer has a thickness of 1-3 μm. In one example, the bulk electrolyte layer has a thickness of about 2 μm.

In some embodiments, the bulk electrolyte layer has a higher lithium ion conductivity than the anode interface layer. For example, the bulk electrolyte layer may comprise lithiated $WO_{3+x}$, and more specifically, $Li_2WO_4$.

In some embodiments, the multi-layer solid-state electrolyte may further comprise a cathode interface layer on a surface of the bulk electrolyte layer opposite from the anode interface layer. The cathode interface layer may comprise an elemental early transition metal, alumina ($Al_2O_3$), or an aluminate. In examples where the cathode interface layer comprises the elemental early transition metal, the elemental early transition metal may be selected from Ti, Zr, Nb and Ta. In examples where the cathode interface layer comprises the aluminate, and the aluminate is generally compatible with the bulk electrolyte layer. In further embodiments, the cathode interface layer may have a thickness of 3-30 nm.

In some embodiments, the anode interface layer may comprise $Al_2O_3$, and the multi-layer solid-state electrolyte may further comprise a metal interface layer on a surface of the anode interface layer opposite from the bulk electrolyte layer. In some examples, the metal interface layer may comprise an elemental middle transition metal, such as Cr, Mo, W, or Ru. In other or further examples, the metal interface layer may have a thickness of 10-100 nm.

In another aspect, the present invention relates to a solid-state battery cell, comprising a cathode current collector; a cathode, on or over the cathode current collector; the present multi-layer solid-state electrolyte, on or over the cathode; and an anode current collector, on or over the multi-layer solid-state electrolyte. The anode interface layer is between the bulk electrolyte layer and the anode current collector, and the bulk electrolyte layer is between the anode interface layer and the cathode. Alternatively, the layers of the solid-state battery cell can be in reverse order.

In some embodiments, the battery cell may further comprise a cathode interface layer configured to reduce an interfacial resistance between the cathode and the bulk electrolyte layer. In other or further examples, the anode interface layer may comprise $Al_2O_3$, and the multi-layer solid-state electrolyte may further comprise a metal interface layer between the anode interface layer and the anode current collector. The battery cell may further comprise (but is not required to include) an anode between the anode current collector and the anode interface layer.

In many embodiments, the battery cell further comprises a mechanical substrate in contact with the cathode current collector and configured to support the battery cell. The substrate may comprise a metal foil. The metal foil may comprise steel (e.g., stainless steel), copper, aluminum, nickel, inconel, brass, molybdenum or titanium. In some further embodiments, the substrate may further comprise a barrier covering a major surface of the metal foil. The barrier may inhibit or prevent migration or diffusion of metal atoms from the substrate into one or more layers of the battery cell, and may also provide resistance to corrosion of or chemical attack on the metal foil.

In various embodiments of the battery cell, each of the cathode current collector and the anode current collector may comprise one or more terminal and/or connection regions at an end or side thereof. In some of these embodiments, the terminal and/or connection region(s) of the cathode current collector is/are at a same end or side as the terminal and/or connection region(s) of the anode current collector. In different embodiments, the terminal and/or connection region(s) of the cathode current collector is/are at an opposite end or side from the terminal and/or connection region(s) of the anode current collector.

In yet another aspect, the present invention relates to a method of making a multilayer solid-state electrolyte for a solid-state battery cell, comprising depositing one of a solid bulk electrolyte layer and a solid anode interface layer on an active layer of the battery cell, then depositing the other of the bulk electrolyte layer and the anode interface layer on the one layer. The bulk electrolyte layer comprises carbon-doped lithium phosphorus oxynitride (LiPON) or $WO_{3+x}$, wherein $0 \leq x \leq 1$. The anode interface layer comprises LiPON (e.g., undoped lithium phosphorus oxynitride) or a metal oxide that forms a stable complex oxide with lithium oxide and conducts lithium ions when lithiated. As for the present solid-state electrolyte, the anode interface layer has a thickness less than that of the bulk electrolyte layer.

In some embodiments of the method, depositing the solid bulk electrolyte layer may comprise sputtering using pulsed DC power. When the bulk electrolyte layer comprises carbon-doped LiPON, the carbon-doped LiPON may be sputtered from a mixed graphite-$Li_3PO_4$ target. For example, the mixed graphite-$Li_3PO_4$ target may contain 3-15 wt % of graphite. On the other hand, when the bulk electrolyte layer comprises $WO_{3+x}$, the $WO_{3+x}$ may be sputtered from a metallic or elemental tungsten target, and sputtering from the metallic or elemental tungsten target may be performed in an oxygen or oxygen-containing atmosphere.

When the bulk electrolyte layer comprises $WO_{3+x}$, the method may further comprise lithiating and thermally annealing the $WO_{3+x}$. Lithiating the $WO_{3+x}$ may comprise wet lithiation or dry lithiation. In some embodiments, wet lithiation may comprise immersing the bulk electrolyte layer in a solution containing a lithium electrolyte, and applying an appropriate electric field. In various examples, the lithium electrolyte may comprise $LiClO_4$, $LiPF_6$, or $LiBF_4$. In other embodiments, dry lithiation comprises sputtering or thermally evaporating elemental lithium onto the $WO_{3+x}$ in a vacuum chamber. Following lithiation, thermally annealing the $WO_{3+x}$ may comprise heating the $WO_{3+x}$ at a temperature of 150-500° C. for a length of time of 5-240 minutes. In general, lithiating and thermally annealing the $WO_{3+x}$ transforms the $WO_{3+x}$ into $Li_2WO_4$, but other forms of lithium tungsten oxide (e.g., $Li_xWO_y$, where $y=3+[x/2]$) may be formed.

In some embodiments of the method, the anode interface layer may comprise LiPON. In such embodiments, depositing the LiPON for the anode interface layer may comprise RF sputtering or atomic layer deposition (ALD). In alternative embodiments, the anode interface layer may comprise $Al_2O_3$, $HfO_2$, $ZrO_2$, or ZnO. In such alternative embodiments, depositing the anode interface layer may comprise atomic layer deposition (ALD).

In various embodiments, the method may further comprise lithiating and thermally annealing the anode interface layer. For example, the anode interface layer may be thermally annealed at a temperature of 150-500° C. for a length of time of 5-60 minutes.

In further embodiments, the method may further comprise depositing a metal interface layer on the anode interface layer. The metal interface layer may comprise an elemental middle transition metal, such as Cr, Mo, W, or Ru. Such a metal interface layer may be particularly beneficial when the anode interface layer comprises $Al_2O_3$.

In other or further embodiments, the method may further comprise depositing a cathode interface layer on either the active layer of the battery cell or the bulk electrolyte layer. The cathode interface layer may be configured or adapted to reduce an interfacial resistance between the active layer of the battery cell and the bulk electrolyte layer. In various examples, the cathode interface layer may comprise an elemental early transition metal (such as Ti, Zr, Nb or Ta), alumina ($Al_2O_3$), or an aluminate compatible with both the bulk electrolyte layer and the active layer of the battery cell. The cathode interface layer may be deposited by sputtering, evaporation, ALD, or chemical vapor deposition (CVD).

In a still further aspect, the present invention relates to a method of making a solid-state battery cell, comprising forming one of a cathode current collector and an anode current collector on a substrate, forming a cathode on or over the cathode current collector when the one current collector is the cathode current collector, forming the present multi-layer solid-state electrolyte on or over either the cathode or the anode current collector, forming a cathode on or over the present multi-layer solid-state electrolyte when the one current collector is the anode current collector, and forming the other of the cathode current collector and the anode current collector on or over either the multi-layer solid-state electrolyte or the cathode. The method results in the anode interface layer being between the bulk electrolyte layer and the anode current collector, and the bulk electrolyte layer being between the anode interface layer and the cathode. In one example, the method comprises forming the cathode current collector on the substrate, forming the cathode on or over the cathode current collector, depositing the solid bulk electrolyte layer on or over the cathode, depositing the anode interface layer on the solid bulk electrolyte layer, and forming the anode current collector on or over the anode interface layer. In another example, the method comprises forming the anode current collector on the substrate, depositing the anode interface layer on the anode current collector, depositing the solid bulk electrolyte layer on the anode interface layer, forming a cathode on or over the solid bulk electrolyte layer, and forming the cathode current collector on or over the cathode.

In some embodiments, the method of making the solid-state battery cell further comprises forming a cathode interface layer such that the cathode interface layer is between the cathode and the bulk electrolyte layer. The cathode interface layer may be configured to reduce an interfacial resistance between the cathode and the bulk electrolyte layer. Thus, in one example, the cathode interface layer is formed on the cathode, and the solid bulk electrolyte layer is deposited on the cathode interface layer. In another example, the cathode interface layer is formed on the solid bulk electrolyte layer, and the cathode is formed on the cathode.

Other or further embodiments of the method of making the solid-state battery cell may further comprise forming a metal interface layer such that the metal interface layer is between the anode interface layer and the anode current collector, and/or forming an anode such that the anode is between the anode interface layer and the anode current collector. Thus, in one example, the metal interface layer is formed on or over the anode interface layer, and the anode current collector is formed on or over the metal interface layer. In another example, the metal interface layer is formed on or over the anode current collector, and the anode interface layer is deposited on or over the metal interface layer.

In various embodiments, the substrate may comprise a metal (e.g., stainless steel, copper, aluminum, nickel, inconel, brass, molybdenum or titanium) foil. In such embodiments, the method may further comprise coating or covering a major surface of the metal foil with a barrier, as described for the present battery cell.

The capabilities and advantages of the present invention will become readily apparent from the detailed description of various embodiments below.

DETAILED DESCRIPTION

Figure 1:
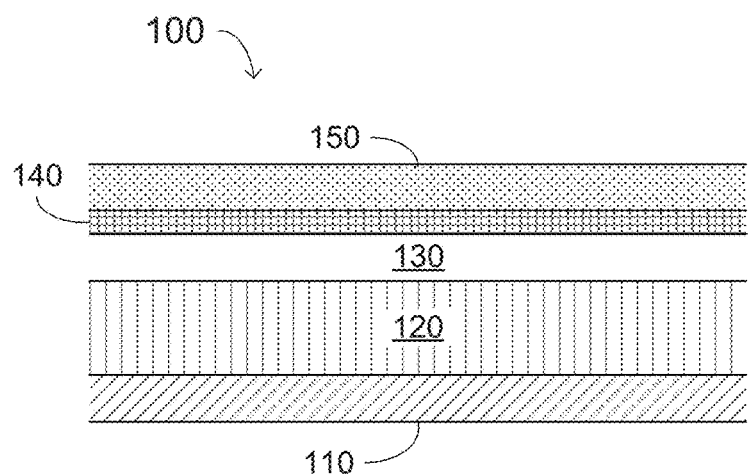
FIG. 1 is a cross-sectional view of a conventional solid-state battery stack.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures and components have not been described in detail so as not to unnecessarily obscure aspects of the present invention. Furthermore, it should be understood that the possible permutations and combinations described herein are not meant to limit the invention. Specifically, variations that are not inconsistent may be mixed and matched as desired.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

For the sake of convenience and simplicity, the term "length" generally refers to the largest dimension of a given 3-dimensional structure or feature. The term "width" generally refers to the second largest dimension of a given 3-dimensional structure or feature. The term "thickness" generally refers to a smallest dimension of a given 3-dimensional structure or feature. The length and the width, or the width and the thickness, may be the same in some cases. A "major surface" refers to a surface defined by the two largest dimensions of a given structure or feature, which in the case of a structure or feature having a circular surface, may be defined by the radius of the circle.

In addition, for convenience and simplicity, the terms "part," "portion," and "region" may be used interchangeably but these terms are also generally given their art-recognized meanings. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Improvements provided by the present invention include a faster deposition rate (e.g., 25% or less) and shorter processing time relative to a conventional LiPON electrolyte, resulting in higher throughput for the solid-state and/or thin film battery production line. The Li-ion conductivity of the present multilayer electrolyte is higher than an otherwise identical single LiPON layer, so the present multilayer electrolyte can have a greater thickness without adversely affecting the charge/discharge rates of the resulting solid-state and/or thin film battery. The greater thickness of the present solid electrolyte layer also results in lower defect rates in the resulting device.

The overall Li-ion conductivity of the present multilayer electrolyte is higher than a LiPON single layer having the same thickness, so a battery including the present multilayer electrolyte shows a higher capacity and higher charge and discharge rates than an otherwise identical battery including a single LiPON layer. Furthermore, the (sub)layers deposited by ALD are highly conformal, which significantly reduces the defect level in the battery due to pinholes.

Exemplary Solid-State Batteries with a Multi-Layer Electrolyte

The present invention concerns a multi-layer solid-state electrolyte and a solid-state battery cell including the same. The multi-layer solid-state electrolyte comprises a solid bulk electrolyte layer comprising carbon-doped LiPON or $WO_{3+x}$ ($0 \leq x \leq 1$), and a solid anode interface layer comprising lithium phosphorus oxynitride (LiPON) or a metal oxide that forms a stable complex oxide with lithium oxide and conducts lithium ions when lithiated. The anode interface layer is thinner (in some cases by 1-2 orders of magnitude or more, or any value or range of values therein) than the bulk electrolyte layer. For example, the bulk electrolyte layer may have a thickness 40-400 times that of the anode interface layer.

The following discussion provides examples of multi-layer electrolytes, solid-state and/or thin film batteries including the same, and general manufacturing processes for such electrolytes and batteries.

An Exemplary Battery Stack Including a Multi-Layer Solid-State Electrolyte

Figure 2:
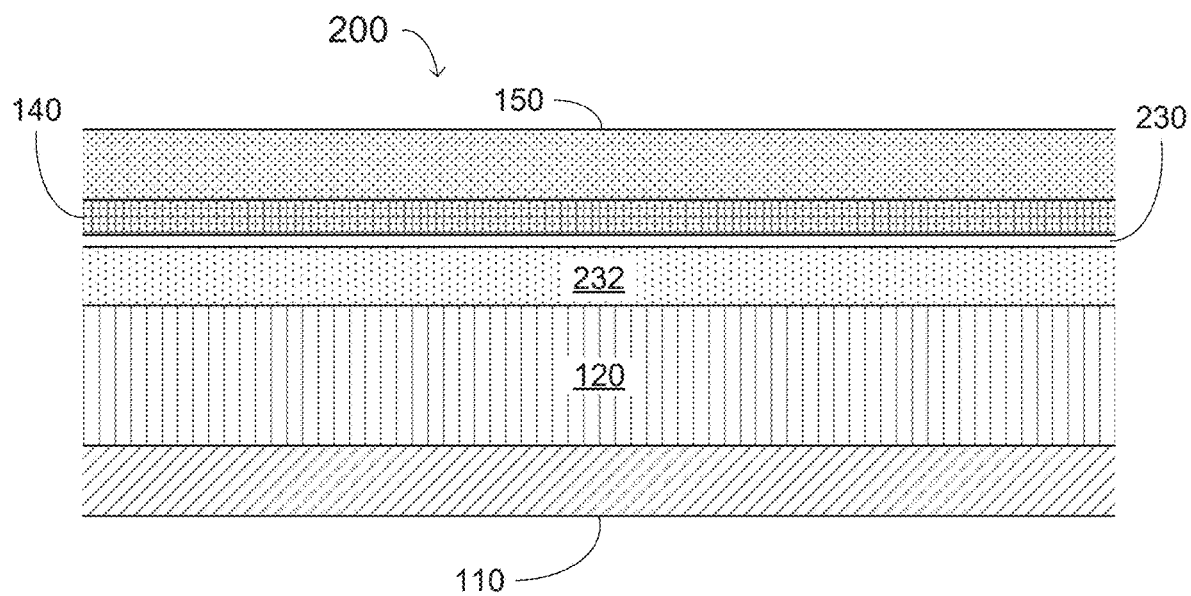
FIG. 2 is a cross-sectional view of an exemplary solid-state battery stack having a multilayer solid-state electrolyte, according to embodiments of the present invention.

FIG. 2 shows a cross-section of an exemplary solid-state battery stack 200 including a multi-layer solid-state electrolyte. The battery stack 200 includes a cathode current collector 110, a cathode 120 (e.g., LCO) on the cathode current collector 110, a multi-layer solid electrolyte 230-232 on the cathode 120, a lithium anode 140 on an anode interface layer 232 of the electrolyte, and an anode current collector 150 on the lithium anode 140. The cathode current collector 110, cathode 120, anode 140 and anode current collector 150 may be substantially the same as in FIG. 1.

Similarly, the anode 140 may not be present when a SSLB including the battery stack 200 is discharged. However, it may be initially deposited onto the anode interface layer 232 during fabrication, and it may be formed or re-formed between the anode interface layer 232 and the anode current collector 150 during a charging operation. Thus, the term "anode interface layer" does not imply that it can interface only with the anode 140. It can also interface with the anode current collector 150, or another interface layer (see FIG. 4 and the discussion thereof).

The multi-layer solid electrolyte 230-232 comprises the anode interface layer 230 and a lower layer 232, both of solid electrolyte. The anode interface layer 230, which may function as a kind of anode or anode current collector interface, is typically relatively thin, and may have a thickness of 2-100 nm, or any thickness or range of thicknesses therein (e.g., ≤50 nm, 3-10 nm, etc.), although the invention is not limited to such values. The anode interface layer 230 is chemically stable against the Li anode 140, may form stable complex oxides with lithium oxide, and may be highly resistive to electrons and/or electron flow. For example, the anode interface layer 230 may have a resistivity of $\geq 10^{10}$ Ohm cm (e.g., $10^{14}$-$10^{20}$ Ohm cm), although the invention is not so limited. The anode interface layer 230 may comprise LiPON (which may be formed by RF sputtering or atomic layer deposition [ALD]) or a (mixed) metal oxide having one or more of the characteristics and/or properties described herein for the anode interface layer 230, such as $Al_2O_3$, $HfO_2$, ZnO, or $ZrO_2$, all of which may be formed by ALD. The anode interface layer 230, when deposited by ALD, can be transformed into a good or excellent Li-ion conductor after lithiation and thermal annealing during device fabrication.

The solid lower electrolyte layer 232 has a higher thickness. For example, the lower electrolyte layer 232 may have a thickness of 0.5-5 μm, or any thickness or range of thicknesses therein (e.g., 1-3 μm, about 2 μm, etc.), but the invention is not limited to such values. The lower electrolyte layer 232 generally has a higher lithium ion conductivity than the anode interface layer 230, and may also be deposited at a higher rate (e.g., by sputtering using pulsed DC power). The lower electrolyte layer 232 may comprise carbon-doped LiPON or $WO_{3+x}$, which may be oxygen-enriched ($0 \leq x \leq 1$, or any value or range of values therein [e.g., 0.5-0.6]). The value of x may be measured by Rutherford backscattering spectrometry (RBS). Carbon-doped LiPON may be formed by sputtering using pulsed DC power and a mixed graphite-$Li_3PO_4$ target (e.g., containing 3-15 wt % of graphite). The $WO_{3+x}$ layer can also be formed by sputtering using pulsed DC power, but from a metallic tungsten target (e.g., in an oxygen-containing atmosphere/environment). Such so-called "DC-sputtering" is a relatively high-throughput process, in comparison to RF sputtering. The $WO_{3+x}$ layer can be transformed into $Li_2WO_4$, a good Li-ion conductor, after lithiation and thermal annealing (e.g., during device fabrication). The lithium ion conductivity of $Li_2WO_4$ is at least one order of magnitude higher than that of LiPON.

Figure 3:
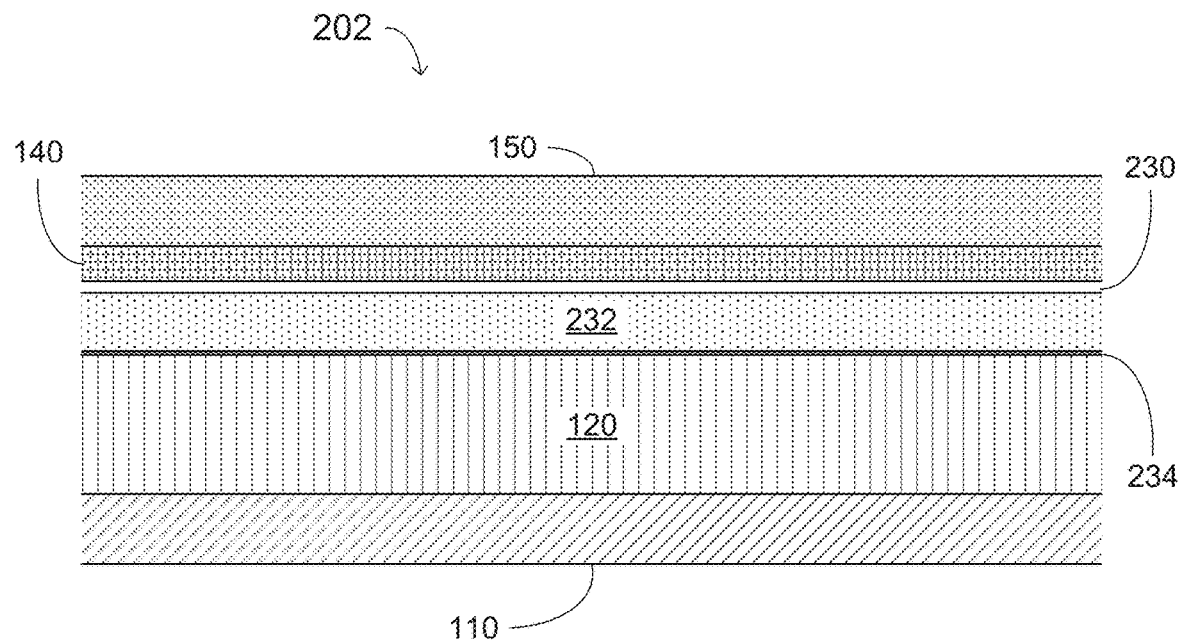
FIG. 3 is a cross-sectional view of an exemplary solid-state battery stack having an alternative multilayer solid-state electrolyte, according to embodiments of the present invention.

Referring now to FIG. 3, an optional third electrolyte layer 234 can be present between the solid bulk electrolyte layer 232 and the cathode 120. This "cathode interface" layer 234 may significantly reduce the interfacial resistance between the cathode 120 and the bulk electrolyte layer 232. In turn, the discharge capacity and discharge rate of a TFB including the present multi-layer solid electrolyte 230-232 and the cathode interface layer 234 may increase significantly. The cathode interface layer 234 may comprise an elemental early transition metal, such as Ti, Zr, Nb or Ta, alumina ($Al_2O_3$), or an aluminate compatible with both the solid bulk electrolyte layer 232 and the cathode 120. The cathode interface layer 234 may have a thickness of 3-30 nm, or any thickness or range of thicknesses therein (e.g., 10 nm), but the invention is not so limited.

Figure 4:
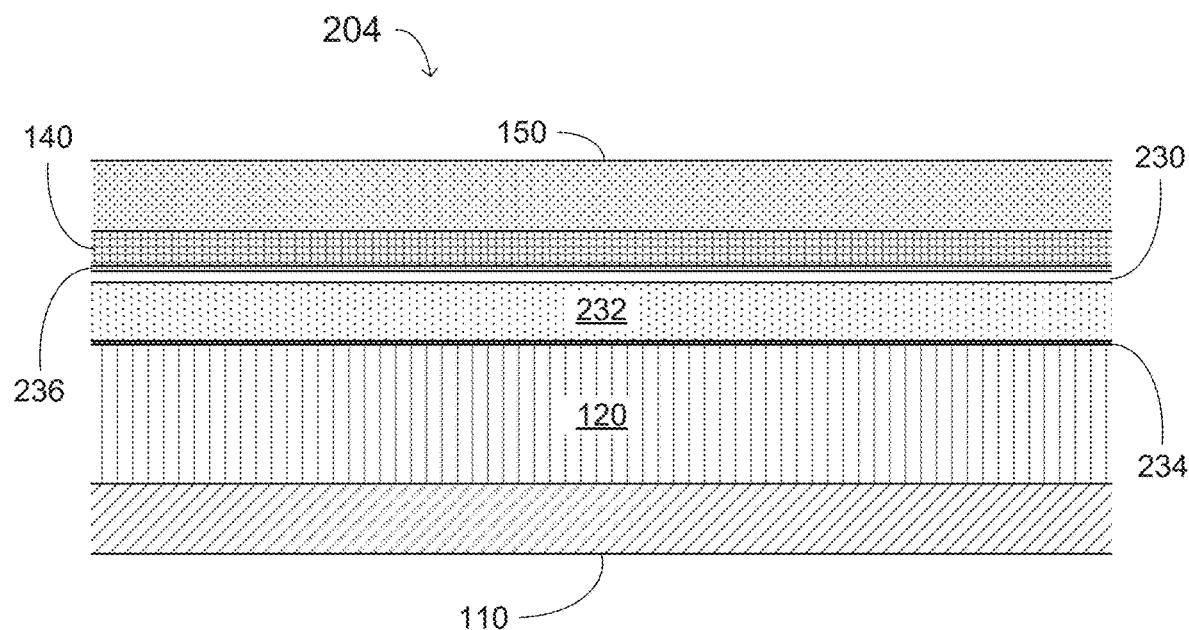
FIG. 4 is a cross-sectional view of an exemplary solid-state battery stack having another alternative multilayer solid-state electrolyte, according to embodiments of the present invention.

Referring now to FIG. 4, when the anode interface 230 is $Al_2O_3$ (e.g., deposited by ALD) an optional metal interface layer 236 can be present between the lithium anode 140 and the anode interface layer 230 to reduce the interfacial resistance between the lithium anode 140 and the anode interface layer 230. The metal interface layer 236 may comprise, for example, an elemental middle transition metal, such as Cr, Mo, W, or Ru. The metal interface layer 236 may have a thickness of 10-100 nm, or any thickness or range of thicknesses therein (e.g., 30 nm), but the invention is not so limited.

An Exemplary Method of Making a Battery Stack with a Multi-Layer Solid-State Electrolyte FIGS. 5A-9B show intermediate and final structures in an exemplary method of making a battery stack with terminals at one end of the battery. FIGS. 5A, 6A, 7A, 8A and 9A are cross-sections of the structures, and FIGS. 5B, 6B, 7B, 8B and 9B are top-down or layout views of the structures.

Figure 5A:
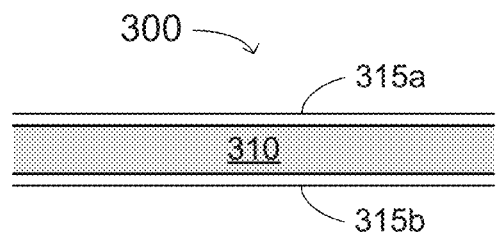
FIGS. 5A-9B show intermediate and final structures in an exemplary method of making a solid-state battery stack with a multilayer solid-state electrolyte, according to embodiments of the present invention.
Figure 5B:
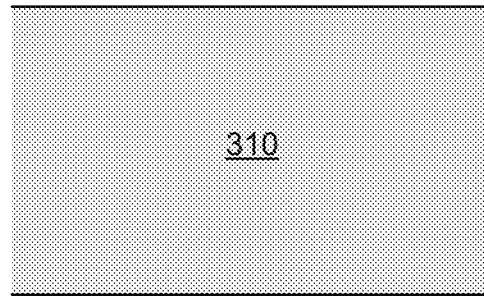

FIGS. 5A-B show a substrate 300, comprising a sheet or film 310 and optional first and second barriers 315a-b on opposite major surfaces of the metal foil 310. In one example, the sheet or film 310 is a metal foil (in which case the first and second barriers 315a-b are not optional). The metal foil may comprise or consist essentially of stainless steel, aluminum, copper, nickel, inconel, brass, molybdenum or titanium, the elemental metals of which may be alloyed with up to 10% of one or more other elements to improve one or more physical and/or chemical properties thereof (e.g., oxygen and/or water permeability, flexibility, resistance to corrosion or chemical attack during subsequent processing, etc.). However, the sheet or film can also be a metal sheet or metal roll. For example, the sheet or film may be 10-100 µm thick, whereas a metal sheet may have a thickness of >100 µm, up to about 1-2 mm, although the invention is not so limited.

The barrier 315a-b comprises one or more layers of one or more materials in a thickness effective to prevent migration of atoms or ions from the metal foil 310 into overlying layers. The barrier material(s) may comprise a glass or ceramic, such as silicon dioxide, aluminum oxide, silicon nitride, a silicon and/or aluminum oxynitride, etc., or a metal nitride, such as aluminum nitride, titanium nitride, titanium aluminum nitride, tungsten nitride, etc. In some embodiments, each of the first and second barriers 315a-b comprises alternating glass/ceramic and metal nitride layers (e.g., a first metal nitride layer, a first glass/ceramic layer, and a second metal nitride layer, which may further comprise a second glass/ceramic layer, a third metal nitride layer, etc.). Each barrier 315a or 315b may have a total thickness of 0.5-3 µm, but the barrier 315 is not limited to this range. The barriers 315a-b may be blanket-deposited onto the sheet or film 310 by chemical or physical vapor deposition, solution-phase coating with a precursor material followed by annealing to form the glass/ceramic or metal nitride, etc. Exemplary barrier materials, structures and thicknesses and methods for their deposition are disclosed in U.S. Pat. No. 9,299,845 and U.S. patent application Ser. No. 16/659,871, filed Oct. 22, 2019, the relevant portions of each of which are incorporated by reference herein. The layout view of FIG. 5B shows the sheet or film 310 without the first barrier 315a thereon.

Figure 6A:
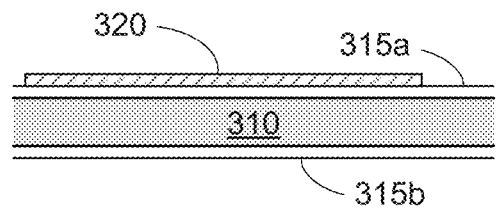
Figure 6B:
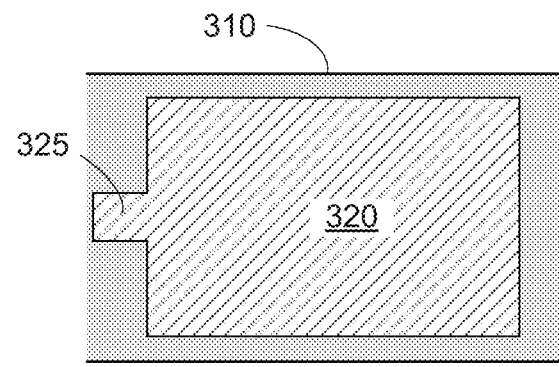

FIGS. 6A-B show the metal substrate 300 with a cathode current collector 320 thereon. The cathode current collector 320 also includes a terminal and/or connecting region 325 near one end of the substrate 300. The cathode current collector 320 generally comprises a conductor, such as gold, silver, copper, platinum, aluminum, or other conductive metal or conductive alloy thereof. The cathode current collector 320 may have a length of 50-98% of the length of the substrate 300 (not including the terminal and/or connecting region 325), and independently, a width of 50-98% of the width of the substrate 300, and a thickness of 0.1-10 µm, but is not limited to these ranges. The terminal and/or connecting region 325 may have a length, and independently a width, of 1-20 mm, although the invention is not limited to this range. The cathode current collector 320 may be selectively deposited by screen printing, inkjet printing, spray coating, etc., or formed by blanket deposition (e.g., sputtering or evaporation) and patterning (e.g., low-resolution photolithography, development and etching).

Figure 7A:
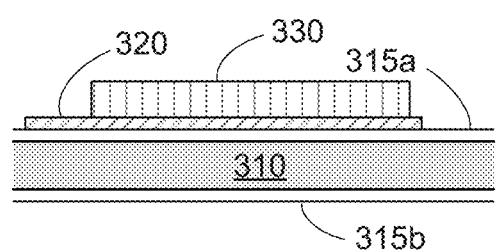
Figure 7B:
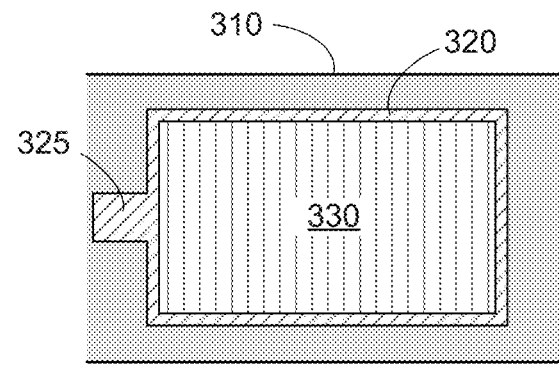

FIGS. 7A-B show a cathode 330 formed on the cathode current collector 320.

The cathode 330 may comprise a lithium metal oxide or lithium metal phosphate, such as lithium cobalt oxide (LiCoO$_2$; LCO), lithium manganese oxide (LiMn$_2$O$_4$; LMO), or lithium iron phosphate (LiFePO$_4$; LFP), for example. The cathode 330 may be blanket deposited by laser deposition (e.g., pulsed laser deposition or PLD), sputtering, chemical vapor deposition (CVD), sol-gel processing, etc., or selectively deposited by screen printing, inkjet printing, spray coating or extrusion coating (e.g., using an ink comprising one or more sol-gel precursors and one or more solvents, having a viscosity appropriate for the printing or coating technique). The cathode 330 may have a length, and independently a width, of 50-98% of the length and width, respectively, of the cathode current collector 320 (not including the terminal and/or connecting region 325, in the case of the length), and a thickness of 1-20 µm, although the dimensions of the cathode 330 are not limited to these ranges.

Figure 8A:
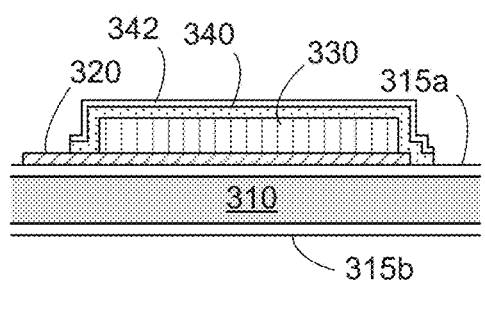
Figure 8B:
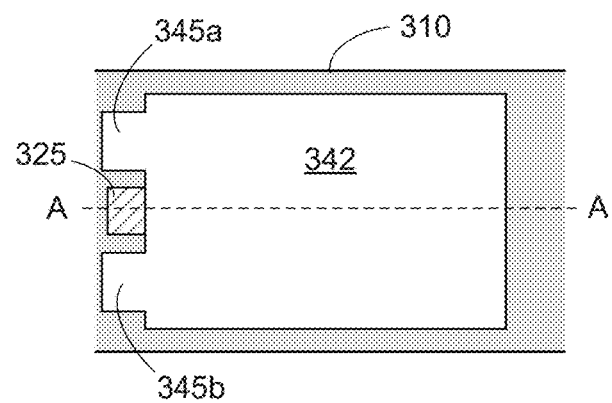

FIGS. 8A-B show a multi-layer solid-state electrolyte 340-342 on the cathode 330 and the cathode current collector 320. The bulk electrolyte layer 340 corresponds to (and may comprise or consist essentially of) the solid bulk electrolyte layer 232 discussed with regard to FIGS. 2-4, and the anode interface layer 342 corresponds to (and may comprise or consist essentially of) the solid anode interface layer 230 discussed with regard to FIGS. 2-4. The cross-section of FIG. 8A is taken along the line A-A in FIG. 8B.

The multi-layer electrolyte 340-342 also includes first and second terminal and/or connecting support regions 345a-b near the same end of the substrate 300 as the terminal and/or connecting region 325. The multi-layer electrolyte 340-342 may have a length, and independently a width, of 101-150% of the length and width, respectively, of the cathode current collector 320 (not including the terminal and/or connecting region 325 and the terminal and/or connecting support regions 345a-b, in the case of the length), but less than the length and width of the substrate 300.

As discussed with respect to FIGS. 2-4, prior to formation of the multi-layer electrolyte 340-342, a cathode interface layer comprising an elemental early transition metal (e.g., Ti, Zr, Nb or Ta), alumina (Al$_2$O$_3$), or an aluminate compatible with both the solid bulk electrolyte layer 340 and the cathode 330 may be deposited onto the cathode 330 by sputtering, evaporation, ALD, chemical vapor deposition (CVD), etc. The cathode interface layer corresponds to (and may comprise or consist essentially of) the optional third electrolyte layer 234 discussed with regard to FIG. 3.

Forming the lower/bulk electrolyte layer 340 may comprise depositing a carbon-doped LiPON layer or a tungsten oxide layer of the formula WO$_{3+x}$ (0≤x≤1) by sputtering using pulsed DC power. The sputtering target may comprise a mixed graphite-Li$_3$PO$_4$ target containing 3-15 wt % of graphite when the bulk electrolyte layer 340 comprises a carbon-doped LiPON and a metallic/elemental tungsten target when the bulk electrolyte layer 340 comprises a tungsten oxide. In the latter case, sputtering is performed in an oxygen or oxygen-containing atmosphere. The method of making the multi-layer electrolyte 340-342 may further comprise lithiating and thermally annealing the WO$_{3+x}$ electrolyte layer 340, which can transform it into Li$_2$WO$_4$, a good Li-ion conductor. Lithiating may comprise wet lithiation (e.g., immersing the lower/bulk WO$_{3+x}$ layer 340 in a solution containing a lithium electrolyte such as LiClO$_4$, LiPF$_6$, LiBF$_4$, etc., and applying an appropriate electric field) or dry lithiation (e.g., sputtering or thermally evaporating elemental lithium onto the tungsten oxide layer 340 in a vacuum chamber, optionally while heating the substrate 300). Thermal annealing may comprise heating at a temperature of 150-500° C. for a length of time of 5-240 minutes, or any temperature or length of time therein (e.g., 250-450° C. for 10-120 minutes), in a conventional oven, a vacuum oven, or a furnace. To ensure substantially complete diffusion of the lithium into and/or throughout the lower/bulk WO$_{3+x}$ layer 340, the lower/bulk WO$_{3+x}$ layer 340 should be annealed (preferably in air) at a temperature of at least 300° C. for at least 30 minutes (e.g., to transform it into Li$_2$WO$_4$).

The anode interface layer 342 generally comprises a lithium-containing glass or ceramic material. Although lithium phosphorus oxynitride (LiPON) is preferred, the anode interface layer 342 may also comprise a lithium borosilicate (Li$_2$O—B$_2$O$_3$—SiO$_2$), a lithium vanadosilicate (Li$_2$O—V$_2$O$_5$—SiO$_2$), a lithium aluminum/titanium phosphate (Li$_{1+x}$Al$_x$Ti$_{2-x}$[PO$_4$]$_3$, or LATP), lithium lanthanum zirconium oxide (Li$_7$La$_3$Zr$_2$O$_{12}$, or LLZO), etc., and can be deposited by sputtering, CVD, or atomic layer deposition (ALD).

When the anode interface layer 342 comprises LiPON, it may be deposited by RF sputtering or ALD. Alternatively, when the anode interface layer 342 comprises a metal oxide such as Al$_2$O$_3$, HfO$_2$, ZrO$_2$, or ZnO, it may be deposited by ALD. These ALD-deposited layers can be transformed into good or excellent Li-ion conductors using the lithiation and thermal annealing processes described above. Because the anode interface layer is relatively thin (e.g., ≤100 nm thick), it can be made with relatively high throughput, even when it comprises LiPON or a layer made by ALD (e.g., Al$_2$O$_3$, HfO$_2$, ZrO$_2$, ZnO). When the anode interface layer 342 comprises a metal oxide, the metal oxide layer 342 should be lithiated and annealed similarly to the lower/bulk WO$_{3+x}$ layer 340 (e.g., to transform it into a lithium ion conductor, such as LiAlO$_2$, Li$_2$ZrO$_3$, or Li$_2$HfO$_3$). For example, annealing may be conducted at the same temperatures and in the same equipment and environment (e.g., air), but for a shorter length of time (e.g., 5-60 minutes).

Optionally, when the upper electrolyte layer 342 is Al$_2$O$_3$, a thin metal interface layer may be deposited on the upper electrolyte layer 342, for example by ALD, sputtering, evaporation, CVD, etc. This metal interface layer corresponds to (and may comprise or consist essentially of) the metal interface layer 236 discussed with regard to FIG. 4.

The multi-layer electrolyte 340-342 and optional cathode and anode interface layers may be conventionally patterned (e.g., by photolithography, development, etching and ashing) to form the pattern of layer 342 in FIG. 8B. In particular, the lowermost layer of the multi-layer electrolyte 340-342 may be selectively etched (i.e., with respect to the underlying substrate 300 and cathode current collector 320).

Figure 9A:
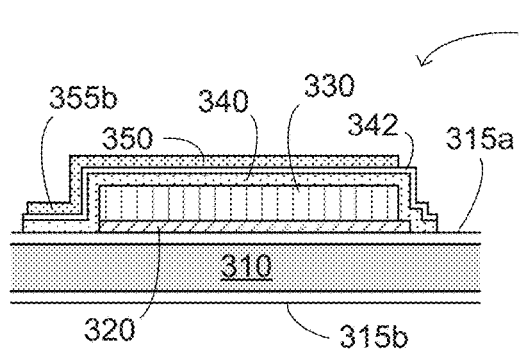
Figure 9B:
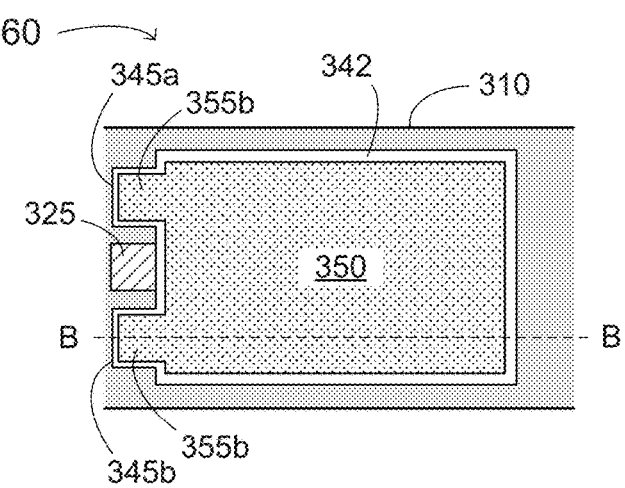

FIGS. 9A-B show an anode current collector 350 on the multilayer electrolyte 340-342, thus forming a complete (but unsealed) cell 360. The cross-section of FIG. 9A is taken along the line B-B in FIG. 9B. (A separately-formed anode is not necessary in solid-state lithium batteries, as a lithium anode can be formed between the electrolyte 340-342 and the anode current collector 350 during charging, although optionally, a thin lithium anode can be deposited by evaporation onto the electrolyte 340-342 prior to formation of the anode current collector 350; see, e.g., FIGS. 2-4.)

The anode current collector 350 also includes first and second terminal and/or connecting regions 355a-b on the terminal and/or connecting support regions 345a-b. The anode current collector 350 generally comprises a conductive metal, such as nickel, zinc, copper, aluminum, etc., or another conductor, such as graphite. The anode current collector 350 can be selectively deposited by screen printing, inkjet printing, spray coating, etc., or formed by blanket deposition (e.g., sputtering or evaporation) and patterning (e.g., low-resolution photolithography, development and etching). The anode current collector 350 may have area dimensions (i.e., length and width dimensions) that are 80-99% of the length and width dimensions, respectively, of the electrolyte layer 340. The anode current collector 350 may have a thickness of 0.1-5 μm, although it is not limited to this range.

The completed cell 360 may further include one or more interlayers that modify the interfaces between layers. For example, a metal oxide (e.g., Nb$_2$O$_5$, Al$_2$O$_3$, Li$_4$Ti$_5$O$_{12}$ or LiNbO$_3$) interlayer may be formed on the cathode 330 prior to deposition of the multi-layer electrolyte 340-342 (e.g., to reduce interfacial stress, decrease interfacial resistance, or suppress formation of a space charge layer). An amorphous (e.g., elemental silicon) interlayer may be deposited on the anode interface layer 342 prior to formation of the anode or anode current collector 350 to inhibit reduction of the electrolyte. In some embodiments, thermal annealing can modify the interface(s) between the layers of the cell, which can significantly reduce charge transfer resistance. Of course, the battery cell can be made in the reverse order (i.e., the anode current collector may be first formed on the substrate, then the remaining layers deposited in reverse order thereon).

An Exemplary Alternative Battery Stack and Method of Making the Same

FIGS. 10-13B show intermediate and final structures in an exemplary alternative method of making a battery stack with terminals at opposite ends of the battery. The method is quite similar to that described with reference to FIGS. 5A-9B, but the patterns of the active layers of the battery stack generally differ.

Figure 10:
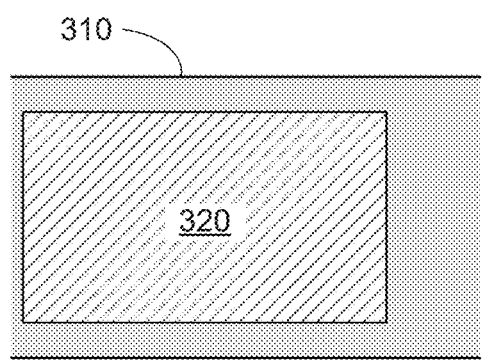
FIGS. 10-13B show intermediate and final structures in an exemplary method of making a battery stack with a multi-layer solid-state electrolyte and terminals at opposite ends of the battery, according to embodiments of the present invention.

FIG. 10 shows the substrate 310 with a cathode current collector 320 thereon.

The cathode current collector 320 is the same as the cathode current collector discussed above with regard to FIGS. 6A-B, except for the pattern. The cathode current collector 320 can be formed by the methods described above, as well as by extrusion coating.

Figure 11:
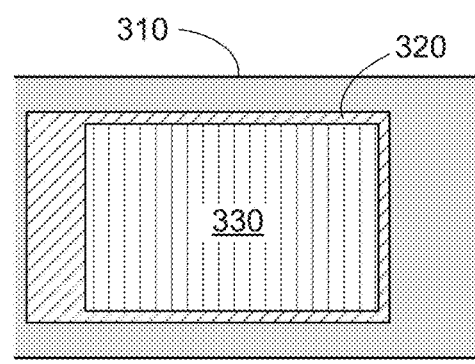

FIG. 11 shows a cathode 330 formed on the cathode current collector 320. The cathode 330 is essentially the same as the cathode described above with regard to FIGS. 7A-B, and can be formed by the methods described above.

Figure 12A:
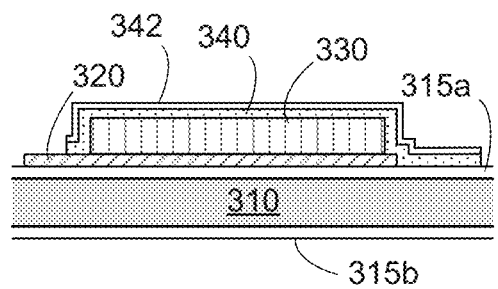
Figure 12B:
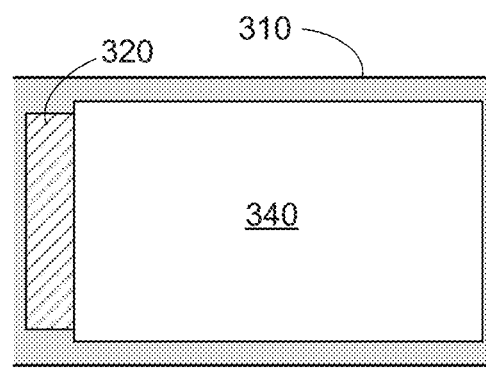

FIGS. 12A-B show the multilayer electrolyte 340-342 on the cathode 330 and the cathode current collector 320. FIG. 12A is a cross-section of the layout view shown in FIG. 12B. The multilayer electrolyte 340-342 is essentially the same as the multilayer electrolyte described above with regard to FIGS. 8A-B, except for the pattern.

Figure 13A:
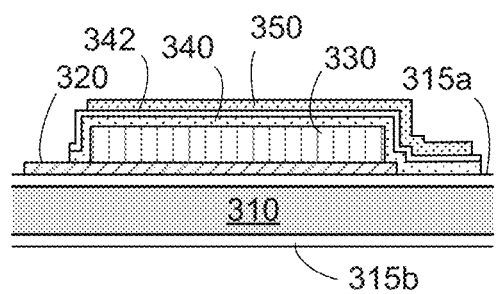
Figure 13B:
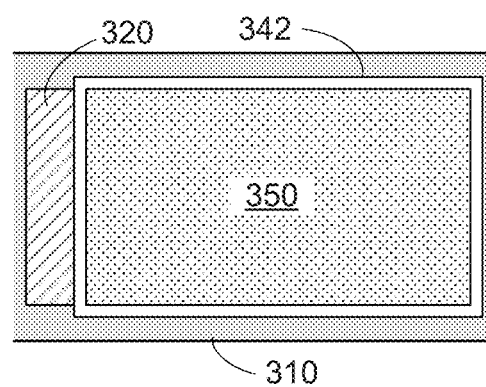

FIGS. 13A-B show an anode current collector 350 on the multilayer electrolyte 340-342, thus forming a complete (but unsealed) cell. FIG. 13A is a cross-section of the layout shown in FIG. 13B. The anode current collector 350 is essentially the same as the anode current collector described above with regard to FIGS. 9A-B and can be formed by the methods, but it can also be formed by extrusion coating. This battery cell can also be made in the reverse order.

CONCLUSION

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A multi-layer solid-state electrolyte, comprising:
   a) a solid bulk electrolyte layer comprising carbon-doped lithium phosphorus oxynitride (LiPON) or $WO_{3+x}$, wherein $0 \leq x \leq 1$; and
   b) a solid anode interface layer comprising LiPON or a metal oxide that forms a stable complex oxide with lithium oxide and conducts lithium ions when lithiated, wherein the anode interface layer has a thickness less than that of the bulk electrolyte layer.

2. The multi-layer solid-state electrolyte of claim 1, wherein the anode interface layer has a resistivity of $\geq 10^{10}$ Ohm cm, and the bulk electrolyte layer has a higher lithium ion conductivity than the anode interface layer.

3. The multi-layer solid-state electrolyte of claim 1, wherein the anode interface layer comprises $Al_2O_3$, $HfO_2$, $ZrO_2$, or ZnO.

4. The multi-layer solid-state electrolyte of claim 3, wherein the anode interface layer further comprises lithium.

5. The multi-layer solid-state electrolyte of claim 1, wherein the bulk electrolyte layer comprises lithiated $WO_{3+x}$.

6. The multi-layer solid-state electrolyte of claim 1, wherein the anode interface layer has a thickness of 10-100 nm, and the bulk electrolyte layer has a thickness of 0.5-5 μm.

7. The multi-layer solid-state electrolyte of claim 1, further comprising a cathode interface layer on a surface of the bulk electrolyte layer opposite from the anode interface layer.

8. The multi-layer solid-state electrolyte of claim 7, wherein the cathode interface layer has a thickness of 3-30 nm and comprises an elemental early transition metal, alumina ($Al_2O_3$), or an aluminate.

9. The multi-layer solid-state electrolyte of claim 1, wherein the anode interface layer comprises $Al_2O_3$, and the multi-layer solid-state electrolyte further comprises a metal interface layer on a surface of the anode interface layer opposite from the bulk electrolyte layer.

10. A solid-state battery cell, comprising:
    a) a cathode current collector;
    b) a cathode, on or over the cathode current collector;
    c) the multi-layer solid-state electrolyte of claim 1, on or over the cathode; and
    d) an anode current collector, on or over the multi-layer solid-state electrolyte,
    wherein the anode interface layer is between the bulk electrolyte layer and the anode current collector, and the bulk electrolyte layer is between the anode interface layer and the cathode.

11. The battery cell of claim 10, further comprising a cathode interface layer configured to reduce an interfacial resistance between the cathode and the bulk electrolyte layer.

12. The battery cell of claim 10, further comprising a metal foil substrate in contact with the cathode current collector and configured to support the battery cell.

13. A method of making a solid-state electrolyte for a battery cell, comprising:
    a) depositing one of:
        i) a solid bulk electrolyte layer comprising carbon-doped LiPON or $WO_{3+x}$, wherein $0 \leq x \leq 1$, and
        ii) a solid anode interface layer comprising lithium phosphorus oxynitride (LiPON) or a metal oxide that forms a stable complex oxide with lithium oxide and conducts lithium ions when lithiated,
    on an active layer of the battery cell; and
    b) depositing the other of the solid bulk electrolyte layer and the anode interface layer on the one of the solid bulk electrolyte layer and the anode interface layer,
    wherein the anode interface layer has a thickness less than that of the bulk electrolyte layer.

14. The method of claim 13, wherein depositing the solid bulk electrolyte layer comprises sputtering using pulsed DC power.

15. The method of claim 14, wherein:
    a) the bulk electrolyte layer comprises carbon-doped LiPON, sputtered from a mixed graphite-$Li_3PO_4$ target; or
    b) the bulk electrolyte layer comprises $WO_{3+x}$, sputtered from a metallic or elemental tungsten target in an oxygen or oxygen-containing atmosphere.

16. The method of claim 15, further comprising lithiating and thermally annealing the $WO_{3+x}$.

17. The method of claim 13, wherein the anode interface layer comprises LiPON, and depositing the LiPON for the anode interface layer comprises RF sputtering or atomic layer deposition (ALD).

18. The method of claim 13, wherein the anode interface layer comprises $Al_2O_3$, $HfO_2$, $ZrO_2$, or ZnO, and depositing the anode interface layer comprises atomic layer deposition (ALD).

19. The method of claim 13, further comprising depositing a cathode interface layer on either the active layer of the battery cell or the bulk electrolyte layer, the cathode interface layer being configured to reduce an interfacial resistance between the active layer of the battery cell and the bulk electrolyte layer.

20. A method of making a solid-state battery cell, comprising:
    a) forming one of a cathode current collector and an anode current collector on a substrate;
    b) forming a cathode on or over the cathode current collector when the one of the cathode current collector and the anode current collector is the cathode current collector;
    c) forming a multi-layer solid-state electrolyte by the method of claim on or over either the cathode or the anode current collector;
    d) forming the cathode on or over the multi-layer solid-state electrolyte when the one of the cathode current collector and the anode current collector is the anode current collector; and e) forming the other of the cathode current collector and the anode current collector on or over the multi-layer solid-state electrolyte or the cathode, such that the anode interface layer is between the bulk electrolyte layer and the anode current collector, and the bulk electrolyte layer is between the anode interface layer and the cathode.

* * * * *